METHOD FOR GROWING LEAD CONDUCTORS ON PLANAR TRANSISTORS

Original Filed Oct. 23, 1968

INVENTORS
TETUO GEJYO, TADASHI SAITO,
SHIGEKAZU MINAGAWA,
KEIKICHI MORIWAKI, KANJI
OTSUKA, KATSURO SUGAWARA

BY Craig & Antonelli
ATTORNEYS

March 12, 1974 TETUO GEJYO ET AL 3,796,598

METHOD FOR GROWING LEAD CONDUCTORS ON PLANAR TRANSISTORS

Original Filed Oct. 23, 1968 2 Sheets-Sheet 2

INVENTORS
TETUO GEJYO, TADASHI SAITO,
SHIGEKAZU MINAGAWA,
KEIKICHI MORIWAKI, KANJI
OTSUKA, KATSURO SUGAWARA

BY Craig & Antonelli
ATTORNEYS

United States Patent Office 3,796,598

Patented Mar. 12, 1974

3,796,598

METHOD FOR GROWING LEAD CONDUCTORS ON PLANAR TRANSISTORS

Tetuo Gejyo, Tadashi Saito, and Shigekazu Minagawa, Tokyo, Keikichi Moriwaki, Hachioji, and Kanji Otsuka and Katsuro Sugawara, Kodaira, Japan, assignors to Hitachi, Ltd., Tokyo, Japan Original application Oct. 23, 1968, Ser. No. 769,799, now abandoned. Divided and this application Aug. 9, 1971, Ser. No. 170,251

Claims priority, application Japan, Oct. 25, 1967, 42/68,272; Dec. 18, 1967, 42/80,612

Int. Cl. B44d *1/18*

U.S. Cl. 117—217 10 Claims

ABSTRACT OF THE DISCLOSURE

A planar transistor is formed by providing a plurality of electrodes connected to the surface portions of the transistor, said electrodes having whisker lead conductors projecting upwardly thereon which are formed by a vapor-liquid-solid crystal growth method.

CROSS REFERENCES TO RELATED APPLICATIONS

This is a division of application Ser. No. 769,799 filed Oct. 23, 1968, now abandoned.

BACKGROUND OF THE INVENTION

This invention relates to a semiconductor device and its manufacturing method, and more particularly to a semiconductor device capable of being easily fitted to a stem or a circuit plate and its novel manufacturing method.

DESCRIPTION OF THE PRIOR ART

In the assembly of a semiconductor device such as a transistor and a semiconductor integrated circuit, gold or aluminium slender wire conductors are used for the connections between the electrodes on the surface of body of the semiconductor element and outer lead conductors to be bonded with individual terminals. This has complicated assembly work and increased the number of mechanically weak portions. The latter results form the numerous bonds required between the wires, electrodes and leads.

The above defect can be largely eliminated if the connectors between electrodes and outer lead conductors are omitted. One semiconductor device not using connectors utilizes upward projecting lead conductors formed on the electrodes of a semiconductor body to directly connect with outer lead terminals. In this case the projecting conductors have such a structure that solder blocks or metal balls with a diameter large enough to obtain a sufficient height are fused or soldered on the electrodes prior to connecting them to the outer leads. This structure of projecting lead conductors can decrease the number of bonds in the assembly of the device. In particular, if all the electrodes are formed together on one principal surface of the semiconductor body, the connection between the electrodes and the other lead conductors can be done by a single step.

However, according to the above-mentioned structure, the metal balls for projection should be fitted to all electrodes on the semiconductor body. The fitting of balls becomes difficult as the number of electrodes increases. The electrodes cannot be made too small due to the spread of metals ball during welding.

SUMMARY OF THE INVENTION

One object of this invention is to provide a semiconductor device having a plurality of electrodes with projecting lead conductors on the surface of a semiconductor body and a novel method for manufacturing the device.

Another object of this invention is to provide a semiconductor device having a plurality of projecting lead conductors which are formed to have arbitrary dimensions and to be integrated with the surface portion of the electrodes of semiconductor element, and a novel method for manufacturing the device.

A further object of this invention is to provide a semiconductor device having slender connecting lead conductors integrally formed with and projecting from the electrodes of a semiconductor element and a method for manufacturing the device.

According to this invention accomplishing the above-mentioned objects, conductive whiskers are grown by the VLS (vapor-liquid-solid) method on the electrodes of the semiconductor element, thereby forming projecting electrodes. The VLS method is a crystal growth method through the vapor-liquid-solid phase, as disclosed by W. S. Wagner in Applied Physical Letter, vol. 4, No. 5, 1964.

BRIEF DESCRIPTION OF THE DRAWINGS

The above and other objects, composition and features of this invention will be understood more easily by the following explanation with reference to the accompanying drawings, in which.

DESCRIPTION OF THE PREFERRED EMBODIMENTS

Figure 1:
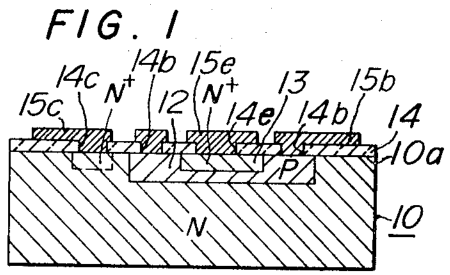
FIGS. 1 to 5 are sectional and planar views of a transistor in the manufacturing steps according to one embodiment of this invention.

FIG. 1 shows a sectional view of a transistor prepared for the application of this invention. The transistor, though it may have either conductivity type, is NPN type here, the collector region is of N type silicon body 10 while P type base region 12 and N type emitter region 13 are made of different types of impurities diffused successively from one surface **10*a*. The surface 10*a* of silicon body 10 is covered with an insulator film, e.g. a silicon dioxide film 14. Metal electrodes 15*e*, 15*b* and 15*c* are provided to contact with the collector, base and emitter regions 10, 12 and 13 respectively through the openings 14*e*, 14*b* and 14*c* formed by partially eliminating the insulator film 14. In this invention, due to several heat treatments required after the formation of said electrodes 15*e*, 15*b* and 15*c***, these electrodes are made of materials with a relatively high melting point, e.g. molybdenum, chromium and tungsten.

Figure 2:
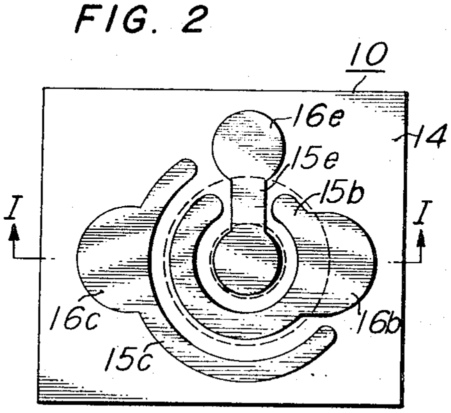

The metal electrodes **15*e*, 15*b* and 15*c* are shaped as shown in FIG. 2 by photoetching a metal film initially deposited on the whole surface of the insulator film 14. FIG. 2 shows the top structure of the transistor shown in FIG. 1, the cross section along the line 1—1 being as shown in FIG. 1. Each of the electrodes has an extended portion 16e, 16b or 16c formed to extend over the surface of the insulator film 14 for forming projecting lead conductors thereon. These extended portions 16e, 16b and 16c have such large areas that the diameters of projecting lead conductors can be chosen arbitrarily. When the electrodes 15e, 15b and 15c are made of molybdenum, considerably high heat treatment can be practiced after their formation in the temperature range (about less than 900° C.) where no bad influence is caused on the PN junction of the transistor since the melting point of molybdenum is about 2600° C. and the slowest eutectic temperature between molybdenum and silicon is about 1400° C. That part of molybdenum which is deposited on the surface of silicon dioxide film ($SiO_2$) 14** forms molybdenum oxide, which is fused and strongly adhered therewith. Therefore, molydenum is suited to the material for terminal conductors.

The deposition of the high melting point metal on the surface of insulator film is almost impossible by the usual resistance heating method. It is very simply done by the electron beam evaporation or sputtering method. The electrodes can be also made of chromium in the same way, as the melting point of chromium is 1900° C. and the lowest temperature between silicon and chromium is 1320° C. Tungsten may be applicable in the similar way.

Figure 3:
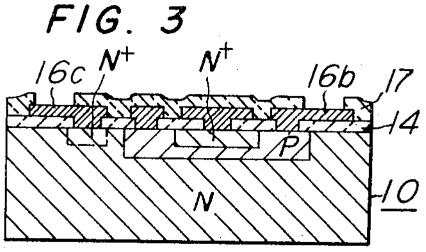
Figure 4:
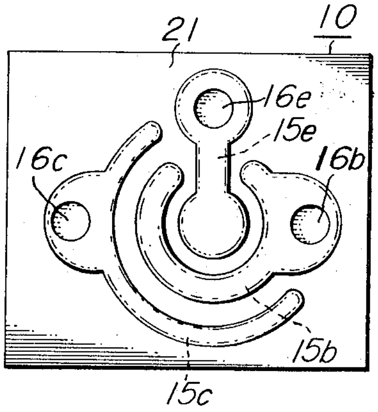

According to this invention, a second insulator film 17 is formed on the surface portion of the transistor body to cover the electrodes 14e, 14b and 14c which are made of material with a relatively high melting point. A portion of the insulator film 17 is removed by photoetching technique thereby to expose a part of extended electrode portions 16e, 16b and 16c, as shown in FIG. 3. FIG. 4 shows a top view of the transistor structure in the step. The second insulator film 17 is formed by depositing silicon dioxide or silicon nitride.

The characteristic of this invention lies in the fact that conductive whiskers are grown by the VLS method on the exposed electrode portions 16e, 16b and 16c thereby forming projecting lead conductors. The conductive whiskers may be either metal or semiconductor highly doped with an impurity. The conductive whiskers are grown by the VLS method in the following manner. A first conductive material which has a lower melting point than that of the electrode material and a relatively small solubility against the electrode material is provided on the surfaces of the exposed electrode portions 16e, 16b and 16c. A second conductive material easily soluble with the first conductive material is applied from vapor phase to react therewith under a suitable temperature condition.

Figure 5:
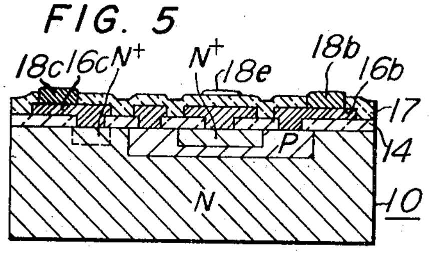

Explanation will be made of the case when copper whisker is grown as a projecting lead conductor. The first conductive material is made of silver or silver-copper alloy containing 30% copper, which is provided on the exposed electrode portions 16e, 16b and 16c as shown by 18e, 18b and 18c in FIG. 5. The first conductive material is fused on the exposed electrode portion like balls or disc type dots, or by evaporation. In the latter case, the first conductive material is initially evaporated on the surface of semiconductor body entirely. Thereafter the semiconductor body is etched to remove the unnecessary portions of the first conductive material and leave only the material formed on the exposed electrode portions. Next the semiconductor body 10 is placed on a hydrogen furnace and heated at about 800° C. Hydrogen gas and copper chloride (CuCl) are introduced and, the second conductive material, is produced by the reduction of CuCl by hydrogen and the deposited on the silver surfaces 18e, 18b and 18c to form Ag-Cu eutectic liquid. The eutectic temperature of an Ag-Cu is about 778° C. If the supply of CuCl gas is continued under the eutectic state, copper is continuously supplied from vapor phase to said eutectic liquid at the respective exposed electrode portions. Copper, therefore, becomes super-saturated in the Ag-Cu eutectic liquid. Excess copper is therefore precipitated on the surface of the electrodes. Thus, copper is grown like whiskers projecting from the electrodes as shown by 19e, 19b and 19c, forming whisker lead conductors. On the top portions 19e, 19b and 19c of the whisker lead conductors the first conductive material, silver, remains as shown by 18e, 18b and 18c.

Figure 6:
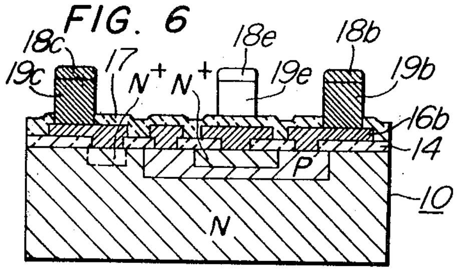
FIG. 6 is a sectional view of a completed transistor in the above embodiment.
Figure 7:
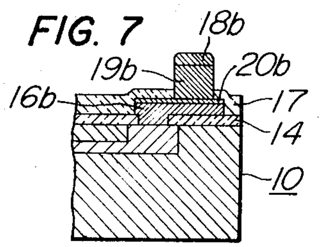
FIG. 7 is a sectional view showing the main portion of a transistor obtained by the manufacturing method according to another embodiment of this invention.

FIG. 7 shows a modified structure of the whisker lead conductor 19b connected to the base region 12 in FIG. 6. According to this embodiment, a third conductive material 20b is preliminarily formed on the surface of electrode portion 16b to strengthen the connection between the whisker 19b and the electrode 16b. Under this condition the VLS crystal growth is practiced.

In view of the above embodiment where the electrode 16b and the conductive whisker 19b are molybdenum and copper respectively, the third conductive material may be made of e.g. gold. In this embodiment if gold is evaporated on the surface of molybdenum electrode 16b and heated above 500° C., it is firmly bonded thereon. Since gold has a strong solubility to copper, the interposition of gold makes the copper whisker grow firmly connected with the surface of molybdenum electrode.

Since it is difficult to dissolve gold with molybdenum, there is no problem of the gold penetrating the molybdenum layer and diffusing into the silicon body 10. Gold also can decrease the equivalent electric resistance in the molybdenum layer. Gold, therefore, presents no inconvenience. When the exposed electrode portion 16b extends over the surface of oxide film 14, the VLS growth is done away from the portion of the electrode connected with the silicon body 10, and neither the diffusion of gold nor the invasion of the first and second whisker material into the silicon body occurs.

According to this invention, the whisker lead conductor may be made of low resistivity semiconductor material highly doped with an impurity as follows.

Gold or platinum is used as the first conductive material while silicon is mainly used as the second conductive material. A P or N type impurity compound is diffused into the whisker, thereby forming on the electrode a silicon whisker highly doped with an impurity. In this case, it is suitable to use monosilane ($SiH_4$) for obtaining the second conductive material, i.e. silicon in vapor phase. Introducing monosilane in a furnace between 700° C. and 900° C. with inert gas such as argon as the carrier gas, silicon is precipitated by thermal cracking. Therefore, when monosilane is introduced with impurity compound gas such as $PH_3$ or $B_2H_6$ into the surface, silicon deposited on the surface of exposed electrode portion of the semiconductor device forms a eutectic crystal with the first conductive material, platinum or gold, existing on the surface of the electrode. Thus, whiskers are formed by the VLS growth on the exposed electrode portion. The whiskers have an extremely low resistance since a large quantity of phosphorus or boron separated from $PH_3$ or $B_2H_6$ is contained in the silicon.

In the case of semiconductor, e.g. silicon whisker lead conductor, it is preferable to deposit a thin layer of about 1$\mu$ of silicon, the same semiconductor material as used in the whisker, preliminarily on the surface of electrode conductor. The first conductive layer used in the VLS method is deposited on said semiconductor layer. The thin silicon layer is first deposited on the entire surface of semiconductor body 10 to cover the second insulator film 17 and the exposed electrode surface by thermal cracking of monosilane, and thereafter this silicon layer is removed by photoetching technique except on the exposed electrode portions. The preliminary formation of the thin semiconductor layer on the portion of whisker lead conductor in advance to the VLS growth can increase the adherence of the to the electrode surface.

The growth speed of the silicon whisker when gold is used as the first conductive material is 1$\mu$/min. at 800° C. and 5$\mu$/min. at 900° C. The speed of platinum as the first conductive material it is 6$\mu$/min. at 800° C. and 7$\mu$/min. at 900° C. Therefore, it is seen in this invention that the growth speed of the whisker lead conductor can be controlled by the first conductive material fused to the whisker and by the reaction time and temperature.

Figure 8:
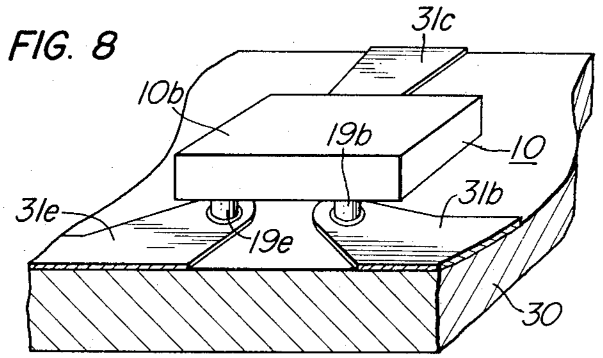
FIG. 8 is a perspective view of a transistor formed in the above embodiment, which is fitted on a thin film or thick film circuit plate.

According to this invention, if the whisker lead conductors 19*e*, 19*b* and 19*c* grown by the above-mentioned precipitation are formed relatively short of the order of 10 to 30μ, the transistor shown in FIG. 8 can be obtained, where the whisker lead conductors 19*e*, 19*b* and 19*c* are directly connected with the conductive layers 31*e*, 31*b* and 31*c* on the substrate 30 in the face-down state. The connection of the transistor with the conductive layers on the substrate can be done either by the ultrasonic vibration applying a pressure on the back face 10*b* of the semiconductor body and generating friction heat for the connection, or depositing low melting point metal such as solder on the surfaces of conductive layers 31*e*, 31*b* and 31*c* and heating the contact portion therebetween.

In FIG. 8, if the substrate 30 is a thin film or a thick film circuit plate, the connection of transistor as shown in this figure can yield a hybrid integrated circuit. However, in this invention the substrate 30 is not always limited to the hybrid integrated circuit. When the conducting layers 31*e*, 31*b* and 31*c* are directly connected to an outer stem lead at their end portions so that the substrate 30 forms a stem substrate, a single transistor element can be obtained.

Figures 9, 10, 11, 12:
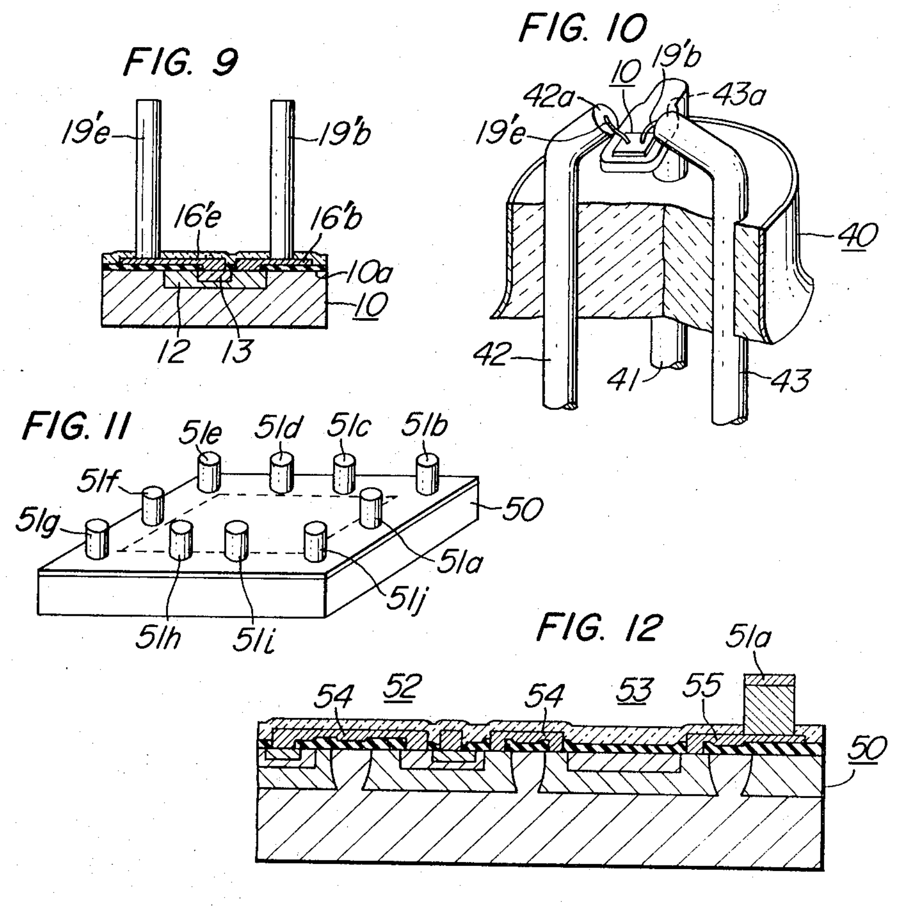
FIG. 9 shows a sectional view of a modified transistor of this invention.
FIG. 10 is a partial perspective sectional view of the transistor shown in FIG. 9 as fitted to a stem.
FIG. 11 is a perspective view of a semiconductor integrated circuit to which this invention is applied.
FIG. 12 shows an example of the sectional structure of the above semiconductor integrated circuit.

FIG. 9 shows another type of transistor of this invention, in which base and emitter electrodes 16*e'* and 16*b'* are provided on one side surface 10*a* of silicon body 10 and the collector electrode is led out from the other side surface 10*b*. Conductive metal whiskers 19*e'* and 19*b'* are formed long by VLS growth on the prescribed portions of the base and emitter electrode metal layers to serve as connector wires. Such a transistor having long metal whiskers can be attached to a general type of stem 40 having collector, base and emitter lead wires 41, 42 and 43. The metal whiskers 19*e'* and 19*b'* are directly connected by thermal compression with the stem lead wires 42 and 43. While the conventional transistor of this type needs four bonding portions on the side of transistor element and on the side of stem, the above inventive transistor needs only two bonding portions on the stem side. A decrease of bonding portions reduces not only the number of steps but also the number of accidents, and therefore considerably increases reliability.

Since lead wires with prescribed dimensions are planted on the prescribed portions of the pellet 40, the whiskers 19*e'* and 19*b'* can be made contact with the stem lead wires 42 and 43 only by bending them in both directions after the semiconductor body 10 is bonded on the collector stem 41. Therefore, if solder is attached preliminarily on the top portions 42*a* and 43*a* of the stem lead wires and fused in time of connection, the connection can be done by extremely simple work. This means that the structure of semiconductor device of this invention is very much suited to automatic assembly with a relatively simple mechanism.

As evident from the above description of the transistors, this invention is particularly effective for a semiconductor integrated circuit device having many external connecting terminals. FIG. 11 shows an example of such a semiconductor integrated circuit device where projecting whisker lead conductors 51*a*, 51*b* . . . 51j are formed on the pads on the semiconductor body 50 containing a plurality of semiconductor circuit elements. Many circuit elements, such as transistor 52, resistor 53 etc. are formed in one united body on the surface portion of silicon substrate 50 as shown in FIG. 12. These elements are connected by conductive wiring means 54. Usually power source terminals or signal terminals from external circuits are formed on a peripheral surface of body 50. In the integral circuit field, the terminal is generally called a pad, on which the whisker lead conductor is formed by the VLS method as shown in the figure. The pad portion is formed by the same metal as the mutual wiring material formed among the element. So if the wiring material is made of molybdenum, which is suitable both for the wiring material and the substrate of the VLS growth, mutual wiring is not damaged by heat treatment during the formation of whisker lead conductors 51*a* . . . 51*j*.

As understood from the above explanation of some embodiments of this invention, the semiconductor device of this invention has a novel structure and unique effect in that projecting whiskers are grown by precipitation through the vapor-liquid-solid phase and are used as external connecting means. Therefore, other conductive materials such as aluminum and iron, which make the VLS crystal growth under a temperature range where no bad influence is caused on the PN junction region in the semiconductor body and the metal conductive layer on the surface of semiconductor body, may be used as whisker lead conductors. It is needless to say that various modifications other than the above embodiments may be made without departing from the spirit of this invention.

What is claimed is:

1. A method for manufacturing semiconductor devices having projecting lead conductors connected to electrodes, each of said electrodes being provided to contact with a semiconductor body through openings formed in a first insulating film covering the surface of said semiconductor body, comprising the steps of:

forming a second insulating film to cover the first insulating film and said electrodes;

selectively exposing a part of the surface portion of each of said electrodes;

providing a first conductive material at said exposed surface portion of the respective electrodes, said first conductive material having its melting point lower than that of the electrode material; and heating said semiconductor body in an atmosphere containing a second conductive material which can be used to make a eutectic crystal with the first conductive material at a temperature of about the eutectic temperature between said first and second conductive materials, whereby whiskers of the second conductive material serving as projecting lead conductors can grow from the exposed surface portions of the respective electrodes.

2. A method for manufacturing semiconductor devices according to claim 1, wherein the electrode material is one selected from the group consisting of molybdenum and tungsten.

3. A method for manufacturing semiconductor devices according to claim 1, wherein the first conductive material is one selected from the group consisting of silver, silver-copper alloy, gold and platinum.

4. A method for manufacturing semiconductor devices according to claim 1, wherein the second conductive material is one selected from the group consisting of copper and silicon doped with an impurity.

5. A method for manufacturing semiconductor devices according to claim 1, wherein the first conductive material is one selected from the group consisting of gold and platinum, and the second conductive material is silicon doped with an impurity.

6. A method for manufacturing semiconductor devices according to claim 1, wherein the second conductive material is a material of semiconductor doped with an impurity.

7. A method for manufacturing semiconductor devices according to claim 6, which further comprises the step of forming a layer of a semiconductor material the same as that of the second conductive material on the surfaces of said electrodes after the step of forming the electrodes and prior to forming the first conductive material.

8. A method for manufacturing semiconductor devices according to claim 1, wherein the first conductive material is one selected from the group consisting of silver and silver-copper alloy, and the second conductive material is copper.

9. A method for manufacturing semiconductor devices according to claim 8, which further comprises the step of forming a third conductive material layer of gold on the surfaces of said electrodes after the step of forming the electrodes and prior to forming the first conductive material.

10. A method for manufacturing semiconductor devices according to claim 9, wherein the electrode material is molybdenum.

References Cited

UNITED STATES PATENTS

| | | | |
|---|---|---|---|
| 3,525,146 | 8/1970 | Hayashida et al. | 29—589 |
| 3,519,504 | 7/1970 | Cuomo | 117—217 |
| 3,493,431 | 2/1970 | Wagner | 117—93.2 |
| 3,674,552 | 7/1972 | Heywang | 117—212 |
| 3,501,681 | 3/1970 | Weir | 317—234 |

CAMERON K. WEIFFENBACH, Primary Examiner

U.S. Cl. X.R.

117—107, 212, 227; 317—234 L, 234 M, 234 R